(12) United States Patent
Kasian

(10) Patent No.: US 9,027,938 B1
(45) Date of Patent: May 12, 2015

(54) SUSPENSION LIFT KIT FOR QUAD CYCLE

(71) Applicant: David Kasian, Narol (CA)

(72) Inventor: David Kasian, Narol (CA)

( * ) Notice: Subject to any disclaimer, the term of this patent is extended or adjusted under 35 U.S.C. 154(b) by 0 days.

(21) Appl. No.: 14/081,618

(22) Filed: Nov. 15, 2013

(51) Int. Cl.
*B60G 17/00* (2006.01)
*B60G 3/00* (2006.01)

(52) U.S. Cl.
CPC *B60G 17/00* (2013.01); *B60G 3/00* (2013.01); *B60G 2300/07* (2013.01)

(58) Field of Classification Search
CPC .. B60G 15/062; B60G 15/063; B60G 17/021; B60G 2202/12; B60G 2202/312; B60G 2204/61; B60G 2400/252; B60G 2500/30; B60G 17/0272; B60G 2204/1242; B60G 2204/12422
USPC ......... 267/195, 286, 166, 170, 177–179, 221, 267/222; 280/6.157, 124.154, 124.179
See application file for complete search history.

(56) References Cited

U.S. PATENT DOCUMENTS

| | | | |
|---|---|---|---|
| 5,044,614 A * | 9/1991 | Rau | 267/221 |
| 5,477,948 A * | 12/1995 | Stevens | 267/221 |
| 5,553,836 A * | 9/1996 | Ericson | 267/286 |
| 5,711,514 A * | 1/1998 | Lu | 267/221 |
| 5,803,443 A * | 9/1998 | Chang | 267/221 |
| 5,961,106 A * | 10/1999 | Shaffer | 267/221 |
| 6,691,991 B1 * | 2/2004 | Huang | 267/291 |
| 6,902,045 B2 * | 6/2005 | Oliver et al. | 188/321.11 |
| 7,631,882 B2 * | 12/2009 | Hirao et al. | 280/6.157 |
| 2002/0038929 A1 * | 4/2002 | Now | 267/217 |
| 2002/0171223 A1 * | 11/2002 | Chan | 280/124.179 |
| 2006/0213733 A1 * | 9/2006 | Masaki | 188/299.1 |
| 2010/0252972 A1 * | 10/2010 | Cox et al. | 267/218 |

* cited by examiner

*Primary Examiner* — Ruth Ilan
*Assistant Examiner* — Laura Freedman
(74) *Attorney, Agent, or Firm* — Adrian D. Battison; Ade & Company Inc.

(57) ABSTRACT

A lift kit for the suspension strut of a Quad ATV cycle including an upstanding sleeve with an upper edge with a collar of reduced diameter defining an upwardly facing annular shoulder at a bottom of the collar, a shock absorber inserted in the sleeve, a washer sitting on the annular shoulder and a coil spring sitting on the washer where the lift kit includes a sleeve member having a bottom collar and an upstanding portion therefrom where the bottom collar has an exterior surface with a diameter greater than that of the upstanding portion and a nut engaged onto the male screw thread on the and being movable to different set portions of a top surface of the nut along the male screw thread on the upstanding portion, the nut having an upper face supporting a bottom of the spring.

3 Claims, 4 Drawing Sheets

SUSPENSION LIFT KIT FOR QUAD CYCLE

This invention relates to a lift kit for attachment to the suspension system of a quad ATV cycle and particularly of a Polaris ATV.

SUMMARY OF THE INVENTION

It is an object of the present invention to provide a lift kit for attachment to the suspension system of a quad ATV cycle and particularly of a Polaris ATV According to the invention there is provided a lift kit apparatus for a suspension strut of a Quad ATV cycle where the suspension comprises:

a suspension strut including an upstanding sleeve having an exterior cylindrical surface and an interior cylindrical surface;

the sleeve having an upper edge with a collar of reduced exterior diameter on the exterior surface at the upper edge and defining an upwardly facing annular shoulder at a bottom of the collar;

a shock absorber having a cylindrical body inserted in the sleeve as a sliding fit within the cylindrical interior surface and standing upwardly from the upper edge;

a washer for sitting on the annular shoulder;

and a coil spring having a bottom turn for sitting on the washer and having an interior dimension arranged to surround the collar and the shock absorber;

wherein the lift kit comprises:

a sleeve member having an interior surface, an exterior surface, a top edge and a bottom edge;

the sleeve member having a bottom collar and an upstanding portion therefrom;

wherein the bottom collar has an exterior surface with a diameter greater than that of the upstanding portion;

the interior surface of the upstanding portion being of a diameter substantially equal to that of the cylindrical interior surface of the suspension strut to receive the shock absorber therein;

the interior surface of the bottom collar being of increased diameter relative to the interior surface of the upstanding portion so as to engage over the collar portion of the suspension strut and so as to sit on the washer;

the upstanding portion having a male screw thread on the exterior surface thereof;

the exterior surface of the upstanding portion having a diameter arranged to receive the spring thereon;

a nut having a female screw thread for engaging onto the male screw thread and being movable to different set portions of a top surface of the nut along the male screw thread;

the nut having an upper face arranged for engaging and supporting a bottom of the spring so that the bottom turn of the spring can be lifted from the washer onto the top surface of the nut so as to lift the spring to provide a lift of the suspension.

Preferably an exterior surface of the nut and the bottom collar is substantially equal.

Preferably an exterior surface of the nut and the bottom collar each include notches for engaging a wrench for rotation of the nut relative to the bottom collar.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
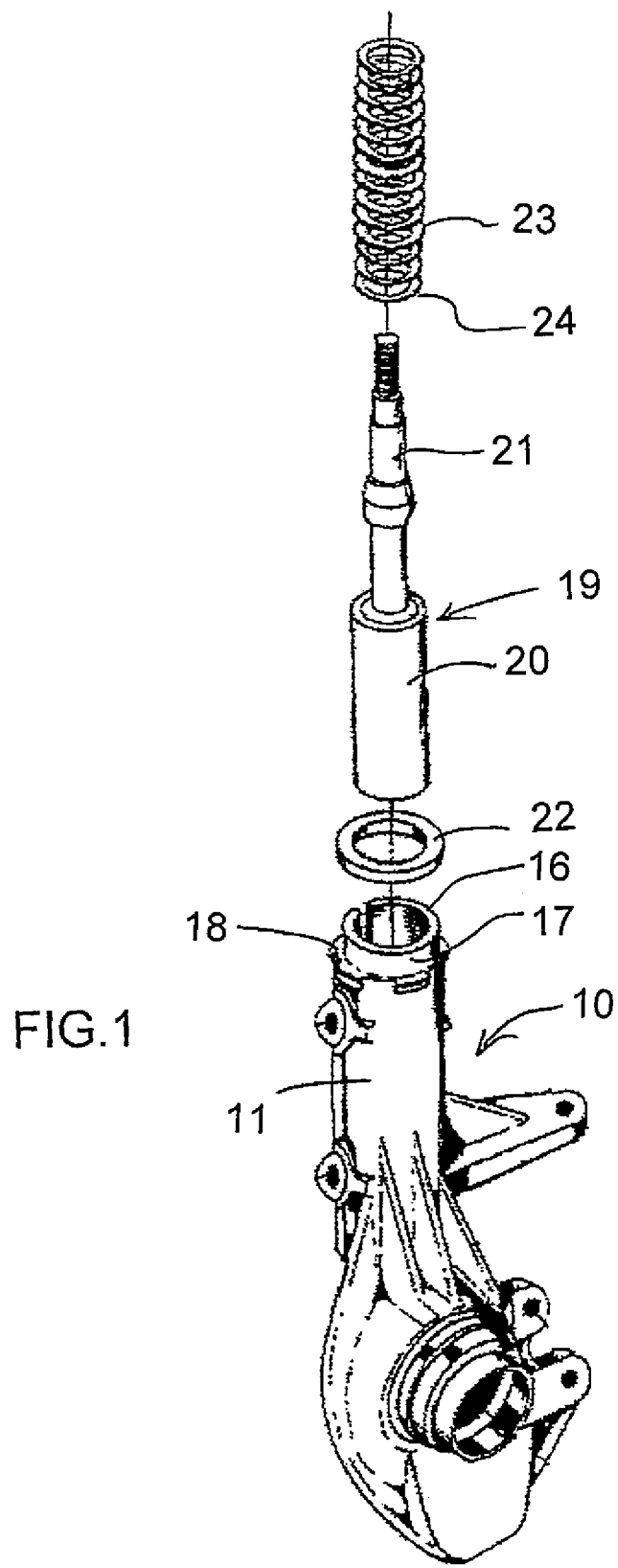
FIG. 1 is an exploded view of the lower suspension components of a suspension of a Polaris Quad ATV cycle for supporting the frame from the wheel with the lift of the present invention omitted.
Figure 2:
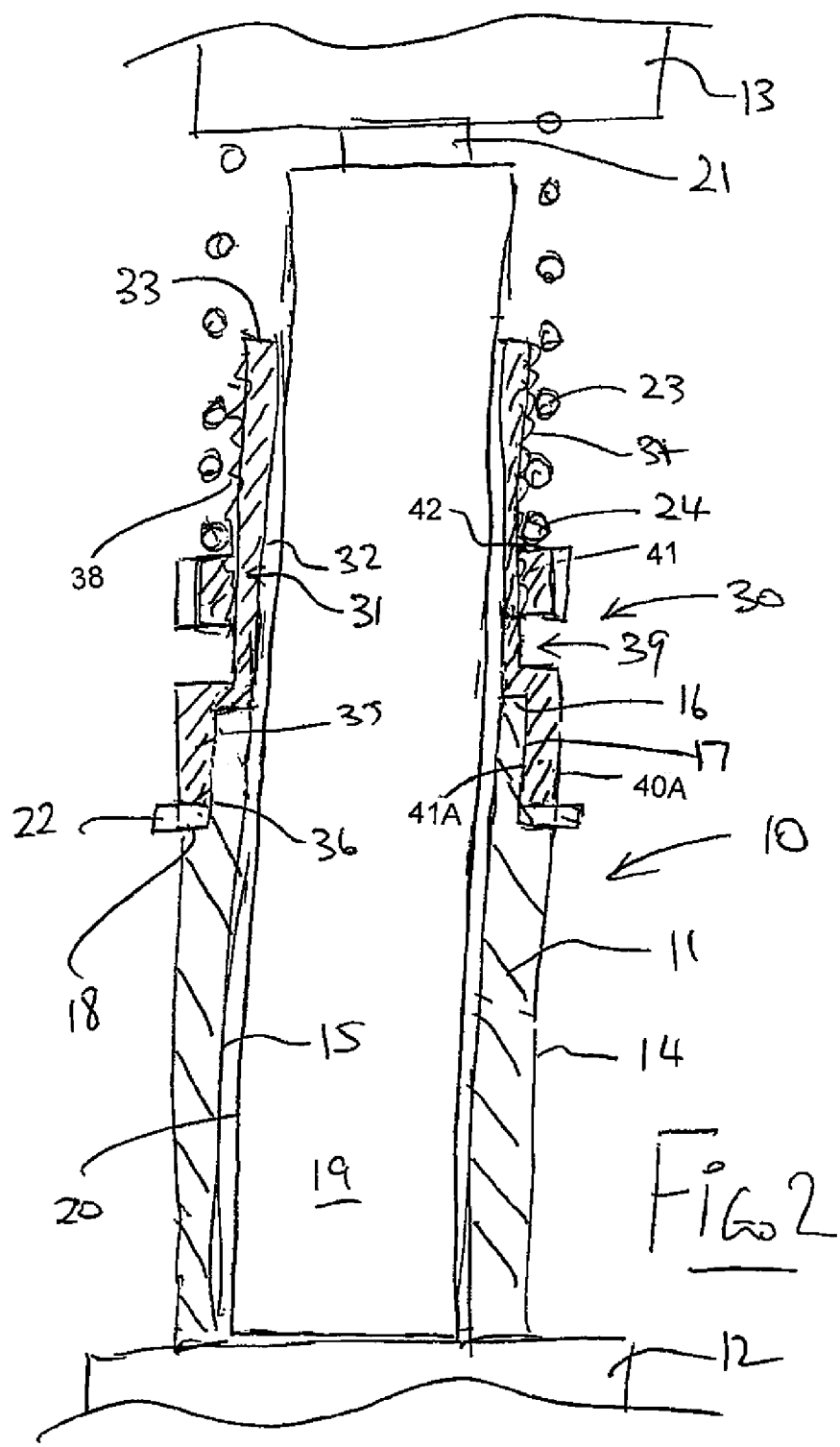
FIG. 2 is a cross-sectional view of the lift apparatus of the present invention in place on the suspension of FIG. 1.
Figure 4:
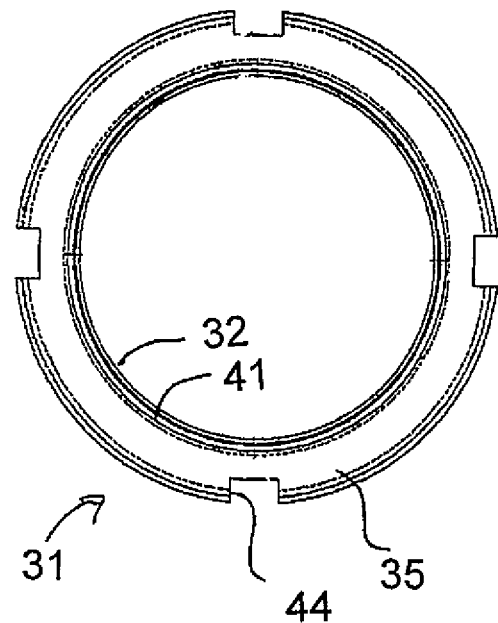
FIG. 4 is a top plan view of the sleeve member of the lift apparatus of the present invention.
Figure 3:
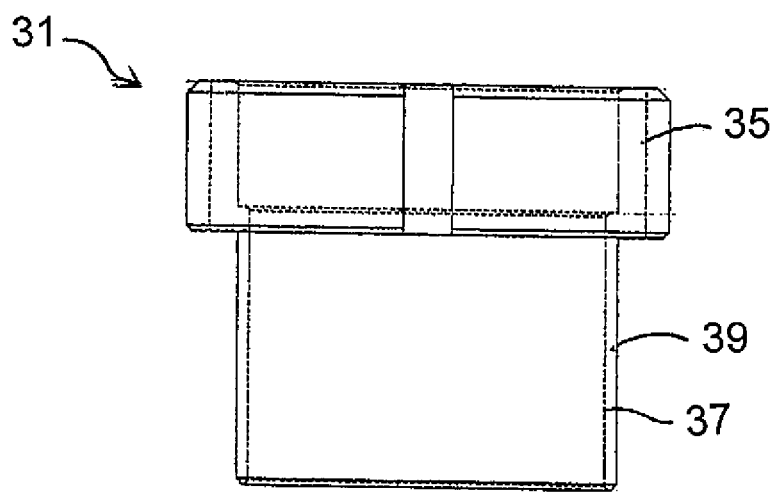
FIG. 3 is a side elevational view of the sleeve member of the lift apparatus of the present invention.
Figure 6:
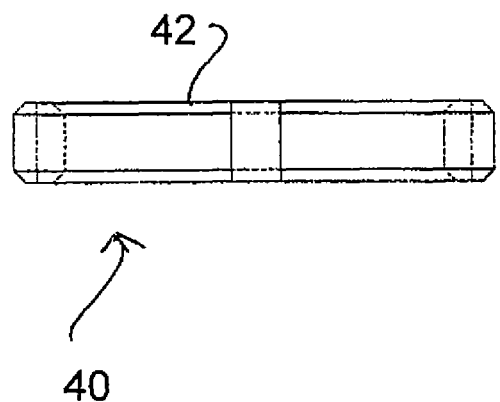
FIG. 6 is a top plan view of the nut of the lift apparatus of the present invention.
Figure 5:
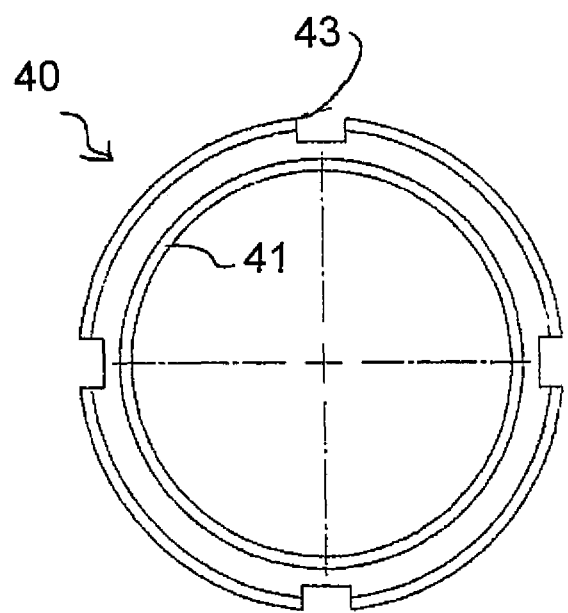
FIG. 5 is a side elevational view of the nut of the lift apparatus of the present invention.

A suspension of a Quad ATV cycle is shown in FIG. 1 in exploded form and comprises a suspension strut 10 including an upstanding sleeve 11. The strut 10 is connected to the wheel (not shown) at a mounting 12 shown schematically in FIG. 2 and the suspension is connected at the upper end to the frame again shown schematically in FIG. 2 at 13.

The sleeve 11 has an exterior cylindrical surface 14 and an interior cylindrical surface 15 with an upper edge 16 having a collar 17 of reduced exterior diameter on the exterior surface at the upper edge and defining an upwardly facing annular shoulder 18 at a bottom of the collar 17.

A shock absorber 19 having a cylindrical body 20 is inserted in the sleeve as a sliding fit within the cylindrical interior surface 15 and standing upwardly from the upper edge 16 to provide a piston 21 engageable with the frame in a shock absorbing action.

A washer 22 sits on the annular shoulder and a coil spring 23 has a bottom turn 24 for sitting, in the conventional arrangement of FIG. 1, on the washer 22 and has an interior dimension of the spring arranged to surround the collar 17 and the shock absorber cylindrical body 20.

The lift kit 30 comprises a sleeve member 31 and a nut 40. The sleeve member has an interior surface 32, an exterior surface 38, a top edge 33 and a bottom edge 36. The sleeve member has a bottom collar 35 and an upstanding portion 39 extending from the top of the collar 35. The bottom collar 35 has an exterior surface 40A with a diameter greater than that of the upstanding portion 39. The interior surface 32 of the upstanding portion 39 is of a diameter substantially equal to that of the cylindrical interior surface 15 of the suspension strut sleeve 11 to receive the shock absorber therein.

The interior surface 41A of the bottom collar 35 is of increased diameter relative to the interior surface 32 of the upstanding portion 39 so as to engage over the collar portion 17 of the suspension strut and so as to sit on the washer 22.

The upstanding portion 39 has a male screw thread 37 on the exterior surface 38 thereof and the exterior surface of the upstanding portion 39 has a diameter arranged to receive the spring 23 thereon.

The nut 40 has a female screw thread 41 for engaging onto the male screw thread 37 and is movable to different set portions of a top surface 42 of the nut along the male screw thread;

The nut having the top face 42 arranged for engaging and supporting a bottom turn 24 of the spring 23 so that the bottom turn of the spring can be lifted from the washer 22 onto the top surface 42 of the nut so as to lift the spring to provide a lift of the suspension.

The diameter of the exterior surface of the nut and of the bottom collar is substantially equal and each includes notches 43, 44 for engaging a wrench for rotation of the nut relative to the bottom collar to adjust the height of the lift.

The use of the machined lift apparatus allows it to fit effectively in place on the collar 17 and to hold the lift at a required lift level for the intended suspension lift.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A lift kit apparatus for a suspension strut of a Quad ATV cycle where the suspension strut comprises:
    an upstanding sleeve having an exterior cylindrical surface and an interior cylindrical surface;
    the sleeve having an upper edge with a collar portion of reduced exterior diameter on the exterior surface at the upper edge and defining an upwardly facing annular shoulder at a bottom of the collar portion;
    a shock absorber having a cylindrical body inserted in the sleeve as a sliding fit within the interior cylindrical surface and standing upwardly from the upper edge;
    a washer for sitting on the annular shoulder;
    and a coil spring having a bottom turn for sitting on the washer and having an interior dimension arranged to surround the collar portion and the shock absorber;
    wherein the lift kit apparatus comprises:
    a sleeve member having an interior surface, an exterior surface, a top edge and a bottom edge;
    the sleeve member having a bottom collar and an upstanding portion therefrom;
    wherein the bottom collar has an exterior surface with a diameter greater than that of the upstanding portion;
    the interior surface of the sleeve member at the upstanding portion being of a diameter substantially equal to that of the interior cylindrical surface of the suspension strut to receive the shock absorber therein;
    the interior surface of the sleeve member at the bottom collar being of increased diameter relative to the interior surface of the sleeve member at the upstanding portion so as to engage over the collar portion of the suspension strut and so as to sit on the washer;
    the upstanding portion having a male screw thread on an exterior surface thereof;
    the exterior surface of the upstanding portion having a diameter arranged to receive the spring thereon;
    a nut having a female screw thread for engaging onto the male screw thread and being movable to different set portions of a top surface of the nut along the male screw thread;
    the nut having an upper face arranged for engaging and supporting a bottom of the spring so that the bottom turn of the spring can be lifted from the washer onto the top surface of the nut so as to lift the spring to provide a lift of the suspension.

2. The apparatus according to claim 1 an exterior surface of the nut is substantially equal to the exterior surface of the bottom collar.

3. The apparatus according to claim 1 an exterior surface of the nut and said exterior surface of the bottom collar each include notches for engaging a wrench for rotation of the nut relative to the bottom collar.

\* \* \* \* \*